United States Patent [19]

Rozelle et al.

[11] Patent Number: 5,033,305
[45] Date of Patent: Jul. 23, 1991

[54] DIGITAL TORSIONMETER

[75] Inventors: Paul F. Rozelle, Fern Park; Michael Twerdochlib, Oviedo, Fla.

[73] Assignee: Westinghouse Electric Corp., Pittsburgh, Pa.

[21] Appl. No.: 462,506

[22] Filed: Jan. 8, 1990

[51] Int. Cl.⁵ .............................................. G01M 1/22
[52] U.S. Cl. ........................................ 73/650; 73/660; 73/661; 364/551.02; 364/565
[58] Field of Search ................. 73/593, 650, 660, 661, 73/862.32; 364/551.02, 565, 569

[56] References Cited

U.S. PATENT DOCUMENTS

| 4,199,719 | 4/1980 | Grob | 364/565 |
| 4,262,538 | 4/1981 | Otawara | 43/593 |
| 4,426,641 | 1/1984 | Karihara et al. | 43/660 |
| 4,434,470 | 2/1984 | Thomas et al. | 364/565 |
| 4,488,240 | 12/1984 | Kapadia et al. | 43/660 |
| 4,608,650 | 8/1986 | Kapadia | 73/660 |
| 4,912,661 | 3/1990 | Potter | 73/660 |

Primary Examiner—Hezron E. Williams
Assistant Examiner—Rose M. Finley

[57] ABSTRACT

The movement of a rotating part of a machine is monitored by deriving a signal representing the motion of the rotating part, at least temporarily storing the derived signal, and analyzing the stored signal, with temporary storage being performed only on portions of the signal derived during spaced time intervals during each revolution of the rotating part.

16 Claims, 2 Drawing Sheets

DIGITAL TORSIONMETER

BACKGROUND OF THE INVENTION

The present invention relates to torsional vibration monitors, particularly for large rotating machines, such as turbine-generators.

It is known that the rotor of a large machine, such as a turbine-generator, can experience torsional vibrations caused, for example, by phase unbalances in the electrical system supplied by the machine, line switching, or turbine pressure transients. Such torsional vibrations can produce shaft damage, particularly at the location of couplings, journals and seals where lower vibration mode stresses are high.

Moreover, turbine blades can interact strongly with higher frequency modes of rotor torsional vibration, which can cause costly blade damage, particularly in the case of long, low pressure turbine blades. The loss of one or more turbine blades can result in unbalances that produce catastrophic failure of the turbine-generator rotor.

Therefore, torsional vibration measurement is an important procedure during design of such machines. Moreover, since extreme or unforeseen combinations of operating conditions, or changes in shaft configuration, can give rise to dangerous torsional vibration conditions subsequent to construction and installation of such a machine, there is a growing demand for continuous, on-line monitoring of the torsional vibrations of machine.

On-line monitoring can yield data that is useful for detecting a vibration problem and allowing for the possibility of resolving the problem before serious damage occurs. The information provided by such monitoring can be used to effect system modifications, or to provide an estimate of the remaining useful life of the machine, or to provide sufficient warning to an operator if a dangerous situation is eminent.

Analog systems for measuring torsional vibrations at the shaft of such machines have been in use for many years. Typically, such measurements are performed by sensing the passage of the teeth of a turning gear, a toothed wheel at the governor pedestal, or a special toothed wheel at the exciter end of a turbine-generator. In recent years, it has also become possible to take measurements at the tips of a row of turbine blades.

While analog systems have been found to produce useful results, they have certain inherent shortcomings. For example, these systems are not well suited to various noise reduction and signal separation techniques which have been developed and which are easily implemented with digital systems. Analog devices are, moreover, subject to drift and calibration errors.

More recently, digital processing systems have been used for engineering tests. These systems also use sensors, such as magnetic or optical pickups, which can detect the passage of gear teeth, blade tips, or other shaft markings past a selected point. Digital systems do not require that the markings or projections which they sense be equally spaced and can easily incorporate digital processing techniques designed to effect noise reduction and controlled signal extraction. If the data is initially digitized, analog demodulation processes can be eliminated since the data are already in a form suitable for further analysis. Digital procedures are inherently stable and require a minimum of calibration and adjustments.

However, existing digital procedures do have a number of drawbacks, particularly in that they require the processing of a large quantity of data and this, in turn, requires substantial data storage capacity and digitization hardware. Moreover, the large quantity of data which must be processed increases the times required for analysis and communication of data values.

While it may be possible to overcome these drawbacks by providing more and faster digitizers, memory and parallel processors, such solutions would substantially increase the cost of the monitoring system, and this, in turn, would limit its potential use.

SUMMARY OF THE INVENTION

It is an object of the present invention to perform torsional vibration analysis rapidly by means of a low cost system.

Another object of the invention is to obtain vibration information in digital form in order to permit the direct use of known digital analysis and noise reduction techniques.

A more specific object of the invention is to reduce the quantity of data which is initially collected in order to enable the data to be processed rapidly by an inexpensive system.

Still another object of the invention is to derive data from a plurality of locations along the length of a machine rotor structure.

The above and other objects are achieved, according to the present invention, in a method for monitoring the movement of a rotating part of a machine, which method includes deriving a signal representing the motion of the part, at least temporarily storing the derived signal, and analyzing the stored signal, by performing the step of temporarily storing only on portions of the signal derived during spaced time intervals during each revolution of the rotating part.

The objects according to the invention are further achieved, in a system for monitoring the movement of a rotating part of a machine, which system includes means for deriving a signal representing the motion of the rotating part, means connected for at least temporarily storing the derived signal, and means connected for analyzing the stored signal, in that the means for temporarily storing comprise signal gating means for permitting storage of the signal derived only during spaced time intervals during each revolution of the rotating part.

DESCRIPTION OF THE PREFERRED EMBODIMENTS

In order to analyze the torsional vibration behavior of the rotor assembly of a machine, such as a turbine-generator, it is desirable to collect torsional vibration data from a plurality of locations along the length of the rotor structure, using a plurality of sensors each disposed opposite a rotating component having a plurality of circumferentially spaced members which will induce output pulses in the sensors. For example, such a rotor structure may be provided with a turning gear having 80-90 teeth and a turbine containing possibly 60-150 blades per row. Special toothed wheels may also be provided on the rotor structure. During rotation of the structure, the passage of each gear tooth or turbine blade can be made to induce a pulse in the output of an associated sensor and the time position of each pulse will provide information regarding torsional vibration behavior of the rotor structure. By analyzing a series of such pulses according to known techniques, information relating to torsional vibration frequencies which are multiples or submultiples of the rate of rotation of the rotor structure can be derived.

Figure 1A:
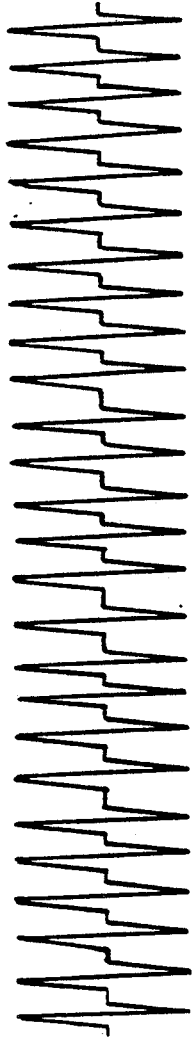
FIGS. 1a-1e are signal waveform diagrams illustrating the manner in which data is collected according to the present invention.
Figure 1B:
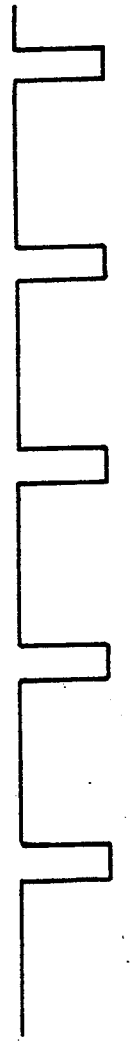
Figure 1C:
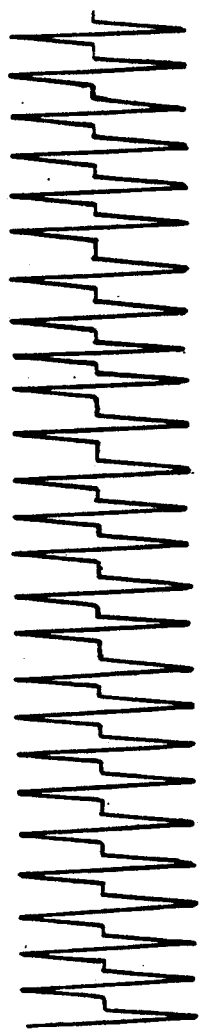

FIGS. 1a and 1c illustrate the output signals produced by two sensors spaced apart along the axis of a rotor structure and each disposed opposite a rotor structure component of the type described above. By way of example, the signal shown in FIG. 1a may be produced by a sensor associated with a turning gear, while the signal shown in FIG. 1c may be produced by a sensor associated with a row of turbine blades. The two sensors may or may not produce the same number of pulses during each revolution of the rotor structure.

Figure 1D:
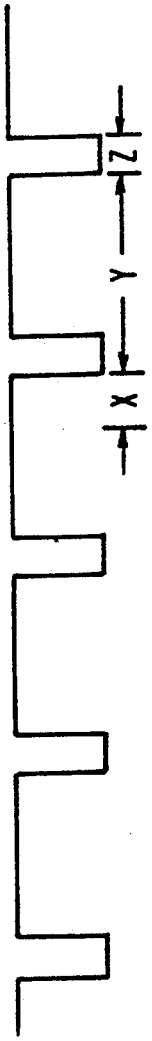
Figure 1E:
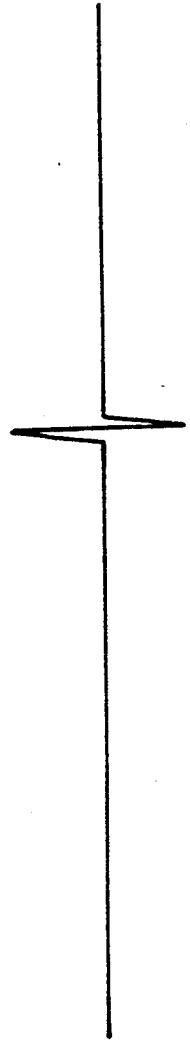

FIG. 1e illustrates the output signal produced by a sensor which is associated with a reference mark or element on the rotor structure to produce one pulse for each revolution of the structure. This pulse is used as a reference signal for allowing a determination of the speed of rotation of the rotor structure.

Whereas it was heretofore the practice to process the entirety of each sensor signal, the present invention achieves a reduction in the quantity of data which must be processed, without any loss of the information required to perform torsional vibration analysis, by gating each of the sensor output signals so that only selected pulses of each sensor output are conducted to the processing system. This may be achieved by connecting the output of each sensor to a digitally controllable gate and opening and closing the gate by gating signals as shown in FIGS. 1b and 1d. Most advantageously, the timing of each gate opening corresponds to the generation of a single pulse by the associated sensor and since the gates are digitally controlled, it is a simple matter to establish gate opening periods which are either separated by uniform time intervals or non-uniform time intervals. The gate opening periods are generated under control of the sensor signal shown in FIG. 1e so that the timing of the gate opening signals can be made to have a fixed relation to the speed of rotation of the rotor structure and to coincide with selected sensor output pulses. Moreover, digital control enables the timing of each gate opening interval to be adjusted so that the associated sensor output pulse occurs substantially at the center of the associated gate opening interval.

Because the signal from each sensor is transmitted to processing circuitry only during gate opening intervals, the quantity of data which must be subsequently processed in substantially reduced. The number of gate opening intervals provided during each revolution of the rotor structure is selected on the basis of the frequencies to be detected. As a general rule, the number of gate opening intervals should be selected so that the frequency of these intervals is two times the highest torsional vibration frequency to be detected and analyzed. The length of each gate opening interval will determine the precision of the frequency resolution which can be achieved by the subsequent data analysis.

Referring specifically to FIG. 1d, the time x between the synchronization pulse shown in FIG. 1e and the next succeeding gate opening interval is selected to establish the desired relation between the gate opening intervals and the associated output pulses of the signal shown in FIG. 1c. The period y between gate opening intervals is selected on the basis of the torsional vibration frequencies to be analyzed and the angular spacing between the marks or projections which produce the sensor output pulses. The duration z of each gate opening interval is selected to permit passage of only one sensor output pulse and will normally be equal to the time required for the rotor structure to rotate through an angle of 360° divided by the number of members, i.e. marks or projections, on the rotor structure which will induce sensor output pulses.

According to preferred embodiments of the invention, gating is controlled so a pulse from only one sensor is passed at any given time. This enables all gated sensor output pulses to be processed in a single channel. This requires that value for x be different for each sensor location, while the value for y may or may not be different from one location to another. If the value of y is different from one location to another, then the number of gate opening intervals per cycle of rotor structure rotation must be selected to assure no overlap of gate opening intervals from one sensor location to another. Alternatively, the gate opening intervals associated with one or more sensors can be spaced apart by nonuniform periods y, which can be easily achieved with digital gating systems. As a result, all of the gated sensor output signals can be time multiplexed into a single channel in which the signals are converted into suitable digital form and transmitted to a memory prior to torsional vibration analysis.

Figure 2:
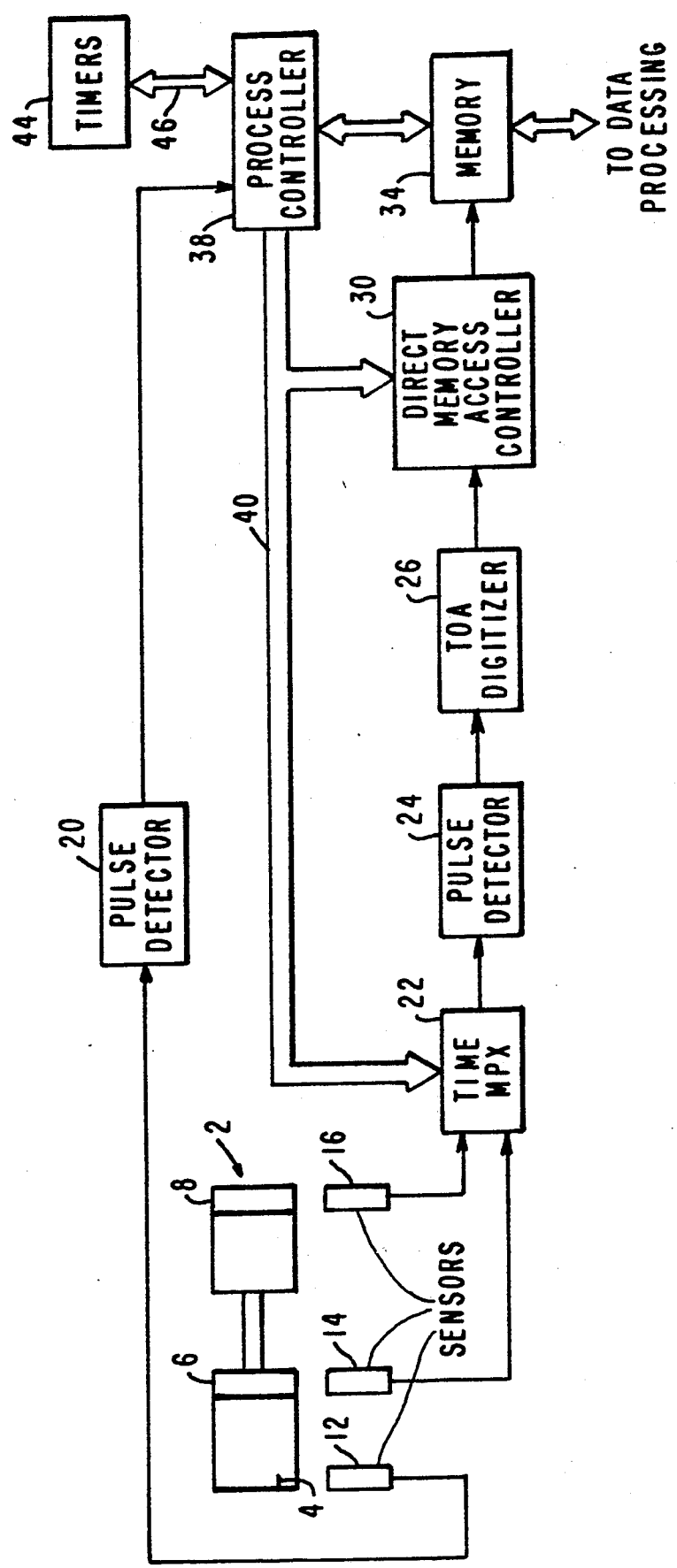
FIG. 2 is a block diagram of a system for implementing the invention.

An embodiment of a system according to the present invention is illustrated in FIG. 2, this system being associated with a rotor structure 2 provided with a single member, i.e., a mark or projection, 4 which can serve to provide the once-per-revolution signal illustrated in FIG. 1e, as well as parts 6 and 8 carrying circumferentially spaced, radially projecting marks or projections which can be detected to produce the output signals shown in FIGS. 1a and 1c.

The system is composed of three sensors 12, 14 and 16, which may be conventional optical, magnetic, electrical, capacitive or ultrasonic sensors. Sensor 12 is disposed to detect each passage of member 4, sensor 14 is disposed to detect each passage of a member of part 6 and sensor 16 is disposed to detect the passage of each member of part 8.

The output pulses produced by sensor 12 are conducted to a pulse detector 20 which serves essentially to shape each output pulse produced by detector 12 into a form suitable for delivery to a digital system.

The output signals from sensors 14 and 16 are supplied to respective inputs of a time multiplexer 22 which is essentially a digitally controlled gating device that performs the gating operation depicted in FIGS. 1b and 1d so as to deliver successive pulse samples to a further pulse detector 24 which performs the same function as pulse detector 20.

As was indicated earlier herein, and as will be explained in greater detail below, the timing of the gate opening signals supplied to multiplexer 22 is set so that the output from only one of sensors 14 and 16 is permitted to pass at any given time, whereby all of the gated output signals can be processed in a single channel which includes pulse detector 24.

Each pulse produced by detector 24 is conducted to a time-of-arrival digitizer 28 which is controlled by a internal clock in such a manner as to produce a digital signal which is coded to indicate the time of arrival of the associated pulse with respect to a fixed time reference.

Each digital signal representing the time of arrival of a respective pulse is transmitted through a direct memory address controller 30 to a computer memory 34. Controller 30 controls the delivery of each digital signal to memory 34 on the basis of the sensor from which that digital signal is derived. Specifically, controller 30 may act to direct each digital signal to a particular group of memory locations associated with a given sensor or may add to each digital signal a flag identifying the associated sensor. This is done so that the signals stored in memory 34 can be properly identified for further processing.

The switching operation of multiplexer 22 and the operation of controller 30 are controlled by signals supplied by a process controller 38 connected to multiplexer 22 and to controller 30 by a parallel bus 40. Process controller 38 receives the once-per-revolution pulses from detector 20 and time of arrival information from memory 34 and is connected to suitable countdown timers 44 via a further parallel bus 46.

Based on the timing of the pulses supplied by detector 20, controller 38 controls timers 44 to be synchronized with the present rate of rotation of structure 2 and thus to provide trigger signals which are used by controller 38 to generate the necessary gate opening signals. The information derived by controller 38 includes not only the timing of the gate opening signals but also identification of which sensor output is to be gated in multiplexer 22 by each gate opening signal. This information is also conducted to controller 30 to enable that controller to properly identify the source of each digital signal from digitizer 28.

Moreover, the timing of each gate opening interval can be adjusted on the basis of time of arrival data supplied to memory 34 in order to adjust the time position of each gate opening interval so that it is centered with respect to an associated sensor output pulse. The operation of process controller 38 would be controlled by suitable programming which can be developed on the basis of principles well known in the art. Essentially, such programming controls the generation of gate opening pulses in response to the trigger signals supplied by timers 44, while the time intervals indicated by timers 44 are regularly updated on the basis of the timing of the pulses received from detector 20. If the rate of rotation of rotor structure 2 should decrease, the interval between pulses from detector 20 will correspondingly increase, causing process controller 38 to increase the intervals between trigger pulses produced by timers 44 and thus the periods between gate opening intervals.

Basically, the timing of the gate opening intervals for the output from each sensor is a fixed function of the period of each revolution of rotor structure 2, with each interval possibly being adjusted, as noted above, to be centered about a respective sensor output pulse.

All of the digital signals stored in memory 34 will be conducted at appropriate times to a data processing system which can analyze these signals according to known techniques to obtain torsional vibration frequency, phase and amplitude information. Since digital signals associated with a plurality of sensors can be stored in memory 34, the relation between those signals can be used to provide the necessary torsional behavior analysis.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. In a method for monitoring the movement of a rotating part of a machine, which method includes deriving a signal representing the motion of the rotating part, at least temporarily storing the derived signal, and analyzing the stored signal, the improvement wherein said step of temporarily storing is performed only on portions of the signal derived during spaced time intervals during each revolution of the rotating part, the rotating part has a group of circumferentially spaced members, said step of deriving comprises disposing a motion sensing element at a location adjacent the part for causing the element to derive a signal containing components representing the passage of each member past the location, and each time interval occurs during passage of a selected member past the location.

2. A method as defined in claim 1 further comprising setting the time intervals such that only one respective selected member passes the location during each time interval.

3. A method as defined in claim 2 further comprising: determining the moment of passage of each selected member past the location; and adjusting the occurrence of each time interval to be substantially centered on the moment of passage of a selected member past the location.

4. A method as defined in claim 3 wherein said step of storing comprises digitizing the signal derived during each time interval and storing the digitized signal.

5. A method as defined in claim 1 wherein the number of members is an integral multiple of the number of time intervals during each revolution of the rotating part.

6. A method as defined in claim 5 wherein the times between successive intervals is longer than the intervals themselves.

7. A method as defined in claim 1 wherein the rotating part has two groups of circumferentially spaced members and said two groups are spaced apart along the axis of rotation of the rotating part, said step of deriving comprises disposing two motion sensing elements each at a respective location adjacent a respective group for causing each element to produce a signal containing components representing the passage of each member of a respective group past the respective location, and said step of storing is carried out for storing signal components produced by each sensing element during respective time intervals corresponding to the passage of selected members of a respective group past the respective location.

8. A method as defined in claim 7 wherein the time intervals associated with the signal from one of the sensing elements are noncoincident with the time intervals associated with the signal from the other one of the sensing elements.

9. In a system for monitoring the movement of a rotating part of a machine, which system includes means for deriving a signal representing the motion of the rotating part, means connected for at least temporarily storing the derived signal, and means connected for analyzing the stored signal, the improvement wherein said means for temporarily storing comprise signal gating means for temporarily storing comprise signal gating means for permitting storage of the signal derived only during spaced time intervals during each revolution of the rotating part, the rotating part has a group of circumferentially spaced members, said means for deriving comprises a motion sensing element disposed at a location adjacent the part for causing said element to derive a signal containing components representing the passage of each member past the location, and each time interval occurs during passage of a selected member past the location.

10. A system as defined in claim 9 further comprising means for setting the time intervals such that only one respective selected member passes the location during each time interval.

11. A system as defined in claim 10 further comprising: means disposed for determining the moment of passage of each selected member past the location; and means connected for adjusting the occurrence of each time interval to be substantially centered on the moment of passage of a selected member past the location.

12. A system as defined in claim 11 wherein said means for storing comprises means for digitizing the signal derived during each time interval and means for storing the digitized signal.

13. A system as defined in claim 9 wherein the number of members is an integral multiple of the number of time intervals during each revolution of the rotating part.

14. A system as defined in claim 13 wherein the times between successive intervals is longer than the intervals themselves.

15. A system as defined in claim 9 wherein the rotating part has two groups of circumferentially spaced members and said two groups are spaced apart along the axis of rotation of the rotating part, said means for deriving comprises two motion sensing elements each disposed at a respective location adjacent a respective group for causing each said sensing element to produce a signal containing components representing the passage of each member of a respective group past the respective location, and said means for storing are operative for storing signal components produced by each sensing element during respective time intervals corresponding to the passage of selected members of a respective group past the respective location.

16. A system as defined in claim 15 wherein the time intervals associated with one of said sensing elements are noncoincident with the time intervals associated with the other one of the sensing elements.

* * * * *